United States Patent
Ha et al.

(10) Patent No.: US 12,122,384 B2
(45) Date of Patent: Oct. 22, 2024

(54) VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventors: Dong-Su Ha, Hwaseong-si (KR); Minseok Song, Gwacheon-si (KR); KyungHun Hwang, Suwon-si (KR); Dong Jun Shin, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 719 days.

(21) Appl. No.: 16/838,550

(22) Filed: Apr. 2, 2020

(65) Prior Publication Data
US 2021/0122376 A1    Apr. 29, 2021

(30) Foreign Application Priority Data

Oct. 23, 2019    (KR) .................. 10-2019-0131903

(51) Int. Cl.
| | |
|---|---|
| *B60W 30/18* | (2012.01) |
| *B60H 1/00* | (2006.01) |
| *B60W 10/06* | (2006.01) |
| *B60W 10/30* | (2006.01) |
| *F02D 41/04* | (2006.01) |

(52) U.S. Cl.
CPC ... *B60W 30/18181* (2013.01); *B60H 1/00735* (2013.01); *B60W 10/06* (2013.01); *B60W 10/30* (2013.01); *F02D 41/04* (2013.01); *B60H 1/00* (2013.01); *B60H 1/00814* (2013.01); *B60W 2510/0676* (2013.01); *B60W 2540/10* (2013.01); *B60W 2552/00* (2020.02)

(58) Field of Classification Search
USPC .......................................................... 701/48
See application file for complete search history.

(56) References Cited

U.S. PATENT DOCUMENTS

| | | | |
|---|---|---|---|
| 2010/0292908 A1* | 11/2010 | Okinaka | F02P 19/025 701/102 |
| 2013/0168458 A1* | 7/2013 | Ichishi | B60H 1/004 237/12.3 A |
| 2019/0232938 A1* | 8/2019 | Ito | B60W 30/188 |
| 2020/0122549 A1* | 4/2020 | Seki | B60W 10/30 |
| 2021/0086657 A1* | 3/2021 | Huntzicker | B60W 10/06 |

FOREIGN PATENT DOCUMENTS

| | | |
|---|---|---|
| JP | 2012076515 A | 4/2012 |
| JP | 2018168754 A | 11/2018 |
| KR | 101683918 B1 | 12/2016 |
| KR | 20190049144 A | 5/2019 |

\* cited by examiner

*Primary Examiner* — Maceeh Anwari
(74) *Attorney, Agent, or Firm* — MCDONNELL BOEHNEN HULBERT & BERGHOFF LLP

(57) ABSTRACT

Disclosed herein is a vehicle and a vehicle controlling method, the purpose is to optimize the control of engine, a heater, and an air conditioner based on running load of the vehicle. In accordance of the present embodiment, a vehicle controlling method of a vehicle including an engine, a heater, and an air conditioner, the method includes determining required heating, latent engine heat, and running load of the vehicle and determining a driving pattern of the vehicle based on the required heating, the latent engine heat, and the running load of the vehicle.

15 Claims, 8 Drawing Sheets

FIG. 6

| HEATING SET TEMPERATURE | 25 ℃ | | |
|---|---|---|---|
| OUTSIDE TEMPERATURE (℃) | 15 ~ 25 | 1 ~ 14 | -20 ~ 1 |
| HEATING SET TEMPERATURE - OUTSIDE TEMPERATURE (℃) | 0 ~ 10 | 11 ~ 24 | 25 ~ |
| LEVEL | 0 | 1 | 2 |

FIG. 7

| ENGINE COOLANT TEMPERATURE (℃) | 40 ~ 69 | 70 ~ 89 | 90 ~ |
|---|---|---|---|
| LEVEL | 0 | 1 | 2 |

FIG. 8

| VEHICLE SPEED \ GRADIENT | STOP | ULTRA-LOW SPEED | LOW SPEED | MEDIUM SPEED | HIGH SPEED | ULTRA-HIGH SPEED |
|---|---|---|---|---|---|---|
| DOWNHILL (LARGE) | 1 | 1 | 1 | 2 | 2 | 3 |
| DOWNHILL (SMALL) | 1 | 1 | 2 | 2 | 3 | 4 |
| PLAIN | 1 | 2 | 2 | 3 | 4 | 4 |
| UPHILL (LARGE) | 1 | 2 | 3 | 4 | 4 | 5 |
| UPHILL (SMALL) | 1 | 3 | 4 | 4 | 5 | 5 |

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0131903, filed on Oct. 23, 2019 in the Korean Intellectual Property Office, the disclosure of which is incorporated by reference in its entirety.

BACKGROUND

1. Technical Field

Embodiments of the present disclosure relate to a vehicle.

2. Description of the Related Art

The vehicle is provided with an air conditioner for controlling the temperature inside the vehicle. The air conditioner allows the temperature of the space inside the vehicle to follow the set temperature through heating or cooling. The set temperature may be a target temperature set by the driver or a target temperature set by a full automatic temperature control system of the vehicle.

When the temperature control of the air conditioner causes a temperature difference between the temperature of the space inside the vehicle and the outside temperature, the low temperature dry air outside the vehicle and the high temperature-high humidity air inside the vehicle cause the inner surface of the vehicle's glass (for example, windshield) to occur steaming.

Or frost may form on the outside surface of the glass due to the very low outside temperature.

Alternatively, water droplets or snowflakes may form on the outer surface of the glass due to rainfall or snowfall.

In this case, a driver may not have a clear view through the glass (especially the front glass), which may cause inconvenience in driving.

Planar heating elements may be used as a means for dry evaporation when condensation, frost, water droplets, snowflakes, etc. form on the glass of the vehicle. That is, by attaching a planar heating element to the glass surface and generating heat through the planar heating element, fog, frost, water droplets and snowflakes can be removed from the glass of the vehicle.

In addition, the vehicle is provided with an air conditioner for adjusting the temperature of the boarding space. The air conditioner adjusts the temperature of the boarding space so that the temperature of the boarding space follows the temperature set by the user (driver). The cooling device is used to lower the temperature of the boarding space, but the latent heat of the engine is used to increase the temperature of the boarding space. Therefore, even if the current running load does not require the operation of the engine, it may occur that the engine is operated to raise the temperature of the boarding space. In such a case, running the engine only for air conditioning causes a decrease in fuel consumption efficiency of the vehicle.

SUMMARY

According to an aspect of the present embodiment, the object is to optimize the control of the engine, the heater and the air conditioner based on the running load of the vehicle.

In accordance with an aspect of the present disclosure, a vehicle controlling method of a vehicle including an engine, a heater, and an air conditioner, a method may include determining required heating, latent engine heat, and running load of the vehicle; and determining a driving pattern of the vehicle based on the required heating, the latent engine heat, and the running load of the vehicle.

Determining the required heating may include determining which level among a plurality of preset levels the size of the required heating load in the vehicle.

The heating load may be a temperature difference between a user set temperature of the air conditioner and an outside temperature of the vehicle.

Determining the latent engine heat may comprise determining which of a plurality of temperature sections the latent engine heat corresponds to.

Determining the latent engine heat may comprise determining the latent engine based on a temperature of a coolant of the engine.

Determining the running load of the vehicle may comprise determining which level among a plurality of preset levels the magnitude of the running load of the vehicle corresponds to.

Determining the running load of the vehicle may comprise determining the magnitude of the running load based on an operation amount of an accelerator pedal of the vehicle and a gradient of a road which the vehicle travels.

Determining the driving pattern may comprise choosing at least one of the heater, the air conditioner, and the engine to satisfy the heating load of the vehicle.

The method may further include driving the heater, the air conditioner, and the engine selectively according to the determined driving pattern when the driving pattern is determined.

In accordance with an aspect of the present disclosure, a vehicle includes an engine; a heater; an air conditioner; a controller configured to determine required heating, latent engine heat, and running load of the vehicle, and determine a driving pattern of the vehicle based on the required heating, the latent engine heat, and the running load of the vehicle.

Determining the required heating may comprise determining which level among a plurality of preset levels the size of the required heating load in the vehicle.

The heating load may be a temperature difference between a user set temperature of the air conditioner and an outside temperature of the vehicle.

Determining the latent engine heat may comprise determining which of a plurality of temperature sections the latent engine heat corresponds to.

Determining the latent engine heat may comprise determining the latent engine based on a temperature of a coolant of the engine.

Determining the running load of the vehicle may comprise determining which level among a plurality of preset levels the magnitude of the running load of the vehicle corresponds to.

Determining the running load of the vehicle may comprise determining the magnitude of the running load based on an operation amount of an accelerator pedal of the vehicle and a gradient of a road which the vehicle travels.

Determining the driving pattern may comprise choosing at least one of the heater, the air conditioner, and the engine to satisfy the heating load of the vehicle.

The controller may drive the heater, the air conditioner, and the engine selectively according to the determined driving pattern when the driving pattern is determined.

In accordance with a present disclosure, vehicle controlling method of a vehicle including an engine, a heater, and an air conditioner, the method may comprise determining required heating, latent engine heat, and running load of the vehicle; and determining a driving pattern of the vehicle based on the required heating, the latent engine heat, and the running load of the vehicle, and determining the driving pattern may comprise choosing at least one of the heater, the air conditioner, and the engine to satisfy the heating load of the vehicle.

In accordance with a present disclosure, vehicle may include an engine; a heater; an air conditioner; a controller configured to determine required heating, latent engine heat, and running load of the vehicle, and determine driving pattern of the vehicle based on the required heating, the latent engine heat, and the running load of the vehicle, and the driving pattern may determine by choosing at least one of the heater, the air conditioner, and the engine to satisfy the heating load of the vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 6 is a diagram illustrating a criterion for determining a required heating level of a vehicle according to an exemplary embodiment.

FIG. 7 is a diagram illustrating a criterion for determining an engine latent heat level of a vehicle according to an exemplary embodiment FIG. 8 is a diagram illustrating a criterion for determining a driving load level of a vehicle according to an exemplary embodiment.

DETAILED DESCRIPTION

Figure 1:
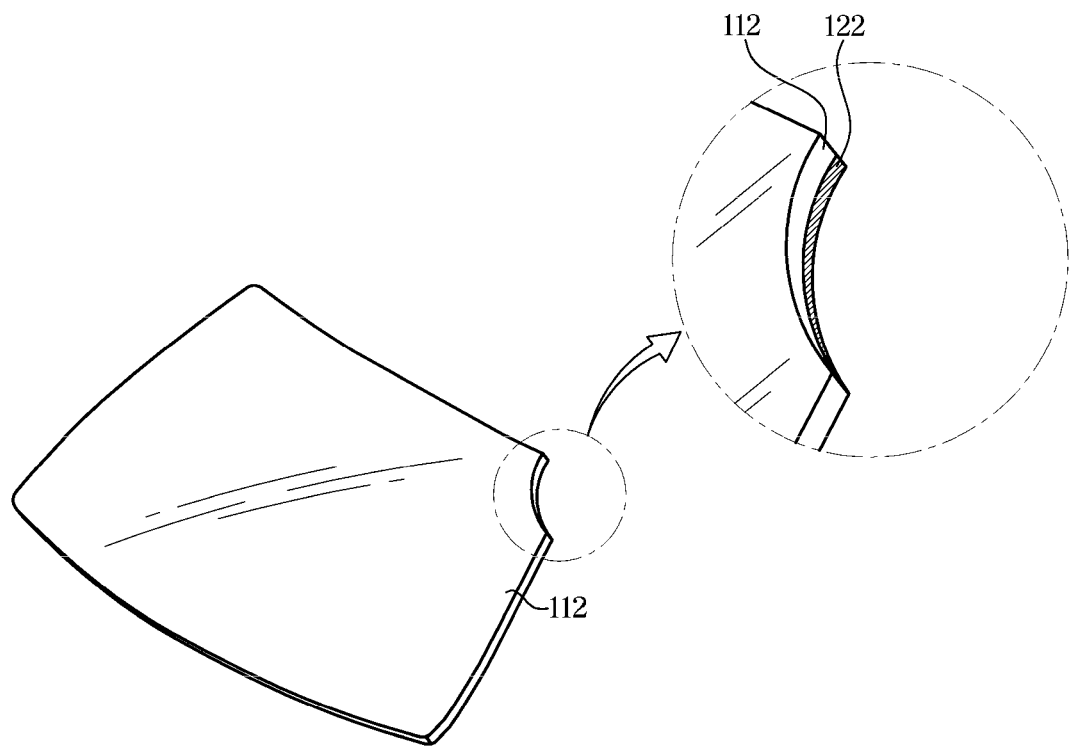
FIG. 1 is a view showing the structure of a planar heating element of a vehicle according to the present embodiment.

FIG. 1 is a view showing the structure of a planar heating element of a vehicle according to the present embodiment. The planar heating element 122 shown in FIG. 1 is one of a plurality of heaters provided in a vehicle according to an exemplary embodiment of the present disclosure. The planar heating element 122 generates heat by electric power supplied through a separate control signal, and removes fog, frost, rain water, snow, etc. of the front glass by using heat generated by the heat. Nanowires are embedded in the planar heating element, and the nanowires are heated by supplying power to the nanowires. An embodiment of the planar heating element 122 of the vehicle shown in FIG. 1 is a case where it is attached to the inner side (indoor side) of the windshield 112 of the vehicle. In addition, the planar heating element 122 may be attached to the side glass, the rear glass, or the outside mirror of the vehicle.

Figure 2:
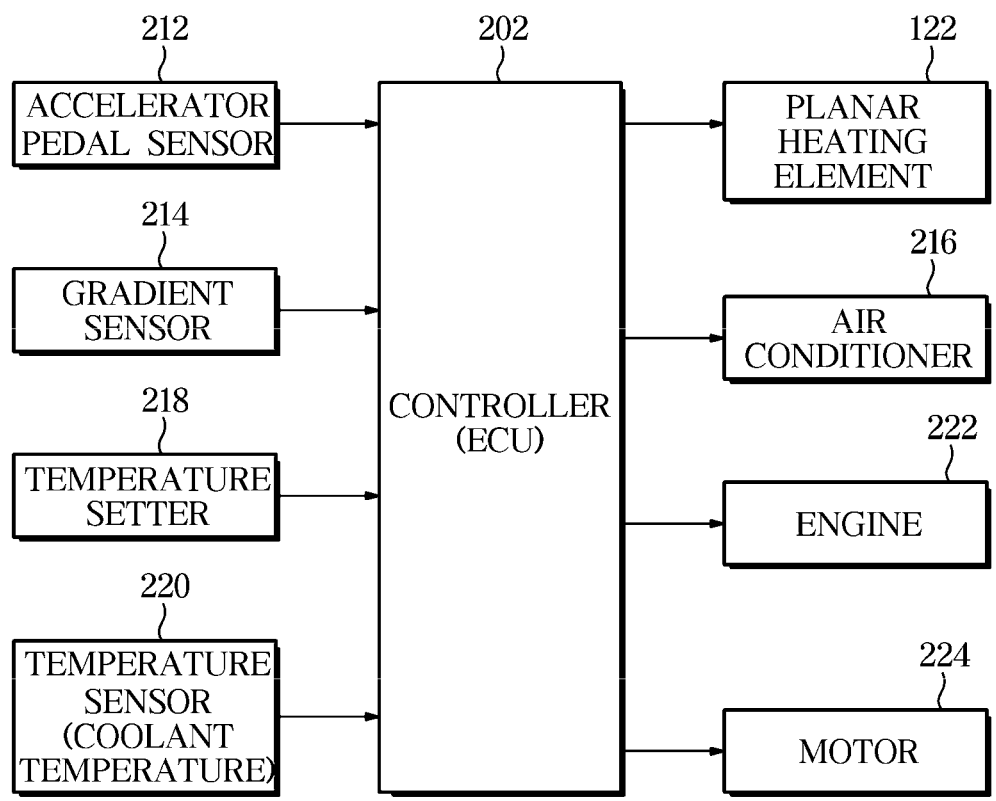
FIG. 2 is a diagram illustrating a control system of a vehicle according to an exemplary embodiment.

FIG. 2 is a diagram illustrating a control system of a vehicle according to an exemplary embodiment. As shown in FIG. 2, the controller ECU 202 generates a planar heating element temperature control signal and an air conditioner temperature control signal based on the vehicle speed information and the gradient information.

The controller 202 may be an electronic control unit (ECU) that controls all or some of the operations of the vehicle. An accelerator pedal sensor 212, a gradient sensor 214, a temperature setter 218, and a temperature sensor 220 are connected to an input side of the controller 202 so as to communicate with each other. As the control target, the planar heating element 122 serving as the heater, the air conditioner 216, and the engine 222 are connected to the output side of the controller 202 so as to be able to communicate with each other. Control area network (CAN) may be used for communication between the controller 202 and other components.

The accelerator pedal sensor 212 is provided to detect an operation amount of the accelerator pedal. When the driver operates the accelerator pedal, the accelerator pedal sensor 212 detects the displacement of the accelerator pedal by the driver's operation and generates an electric signal having a magnitude proportional to the manipulation amount. The controller 202 checks the operation amount of the accelerator pedal through the magnitude of the electric signal generated from the accelerator pedal sensor 212.

The gradient sensor 214 detects a gradient of the road where the vehicle is located (that is, the slope of the road surface) and provides the gradient information to the controller 202.

The temperature setter 218 is a device for setting the temperature of the air conditioner 216. The user can set the target temperature of the air conditioner to a desired temperature by manipulating the temperature setter 218. To this end, the temperature setter 218 may include a heater button (not shown). The user can set the desired target temperature at which the heater button is turned on for heating. The air conditioner 216 operates so that the temperature of the boarding space follows the target temperature set by the user, that is, the set temperature. The air conditioner 216 may use a cooling device to cool down the boarding space (cooling) and use the latent heat of the engine to heat the boarding space (heating).

The temperature sensor 220 is provided to measure the temperature of the coolant used to cool the engine 222. The temperature sensor 220 detects a temperature of the coolant of the engine 222 and transmits coolant temperature information to the controller 202. The controller 202 may check the latent heat of the engine 222 from the coolant temperature detected by the temperature sensor 220.

The controller 202 determines a running load, a required heating level, and an engine latent heat level of the vehicle based on the information provided from the accelerator pedal sensor 212, the gradient sensor 214, and the temperature sensor 220. From this, the heating load of the vehicle is determined, and the optimum driving pattern is determined in consideration of the determination result of the heating load. According to the driving pattern determined by the controller 202, driving of the planar heating element 122, the air conditioner 216, and the engine 222 of the vehicle may be controlled. In this case, the controller 202 performs control to increase fuel consumption efficiency by minimizing driving of the planar heating element 122, the air conditioner 216, and the engine 222. The vehicle control method of the controller 202 will be described with reference to FIGS. 3 to 8 as follows.

Figure 3:
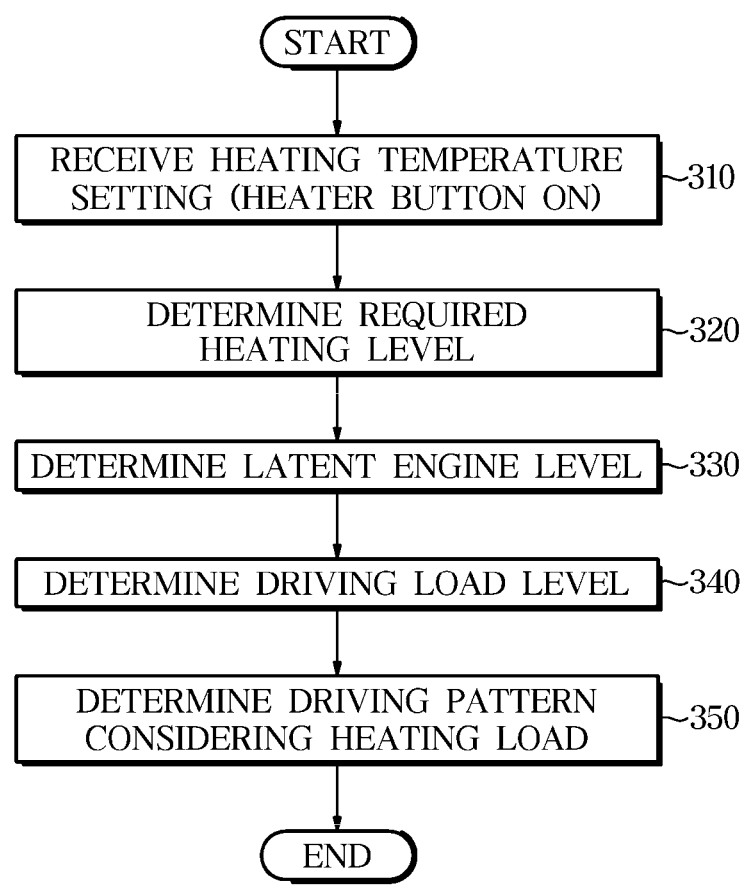
FIG. 3 is a view showing a vehicle control method according to an embodiment.

The motor 224 generates a driving force for driving the vehicle together with the engine 222 or the motor 224 alone when the vehicle is a hybrid vehicle. FIG. 3 is a view showing a vehicle control method according to an embodiment.

First, the controller 202 receives the heating temperature setting value set by the user from the temperature setter 218 (310). For example, when the user sets the desired heating temperature to 25° C., the temperature setter 218 transmits to the controller 202 that the user's set temperature is 25° C. The controller 202 receiving the user's set temperature through the temperature setter 218 controls the air conditioner 216 and the engine 222 such that the latent heat of the engine 222 is discharged to the boarding space through the outlet of the air conditioner 216.

Subsequently, the controller 202 determines 320 a required heating level of the entire vehicle (320). That is, the controller 202 determines which level among a plurality of preset levels the size of the heating load required for the entire vehicle. Determination of the required heating level will be described in more detail with reference to FIGS. 4 and 6 described below.

In addition, the controller 202 determines the latent engine heat level of the vehicle (330). The latent heat of the engine 222 is determined by the temperature of the coolant of the engine 220 detected through the temperature sensor 220. That is, the controller 202 determines which section of the plurality of temperature sections the temperature of the coolant of the engine 222 corresponds to. Since the heating of the air conditioner 216 uses the latent heat of the engine 222, the determination of the latent heat through the temperature of the coolant of the engine 220 is a necessary process for determining whether to drive the engine 222 for heating the boarding space. The determination of the latent engine heat will be described in more detail with reference to FIGS. 4 and 7 to be described below.

In addition, the controller 202 determines the driving load of the vehicle (340). That is, the controller 202 determines which level among a plurality of preset levels the size of the driving load calculated based on the driver's will and the road conditions. If the vehicle is parked or stopped, the driving load will be zero or converge to zero. On the contrary, when the vehicle is driving, the driving load of the vehicle has a value greater than zero according to the driver's acceleration will and the slope of the road. The driver's acceleration will be confirmed through an operation amount of the accelerator pedal detected through the accelerator pedal sensor 212. Gradient of the road may be confirmed through a detection value of the gradient sensor 214. The determination of the driving load level will be described in more detail with reference to FIGS. 5 and 8 to be described below.

Subsequently, the controller 202 determines the driving pattern in consideration of the heating load (350). That is, the controller 202 determines a driving pattern for optimizing fuel consumption efficiency in the current state of the vehicle in consideration of the heating load, the latent heat of the engine, the driving load, and the like, and controls the vehicle to travel along the determined driving pattern. Determination of the driving pattern will be described in more detail with reference to FIG. 5 described below.

Figure 4:
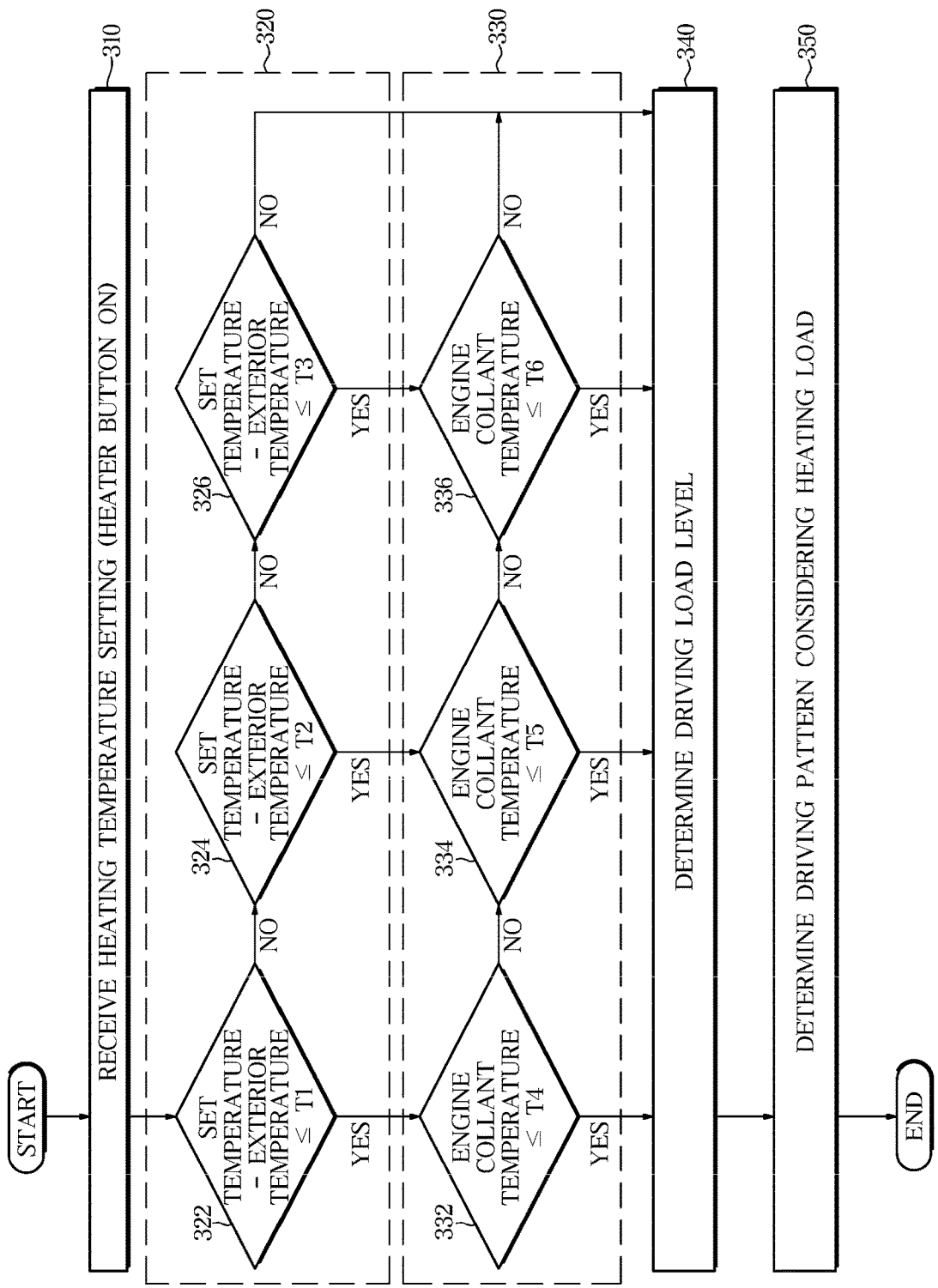
FIG. 4 is a diagram illustrating a method of determining a required heating level and a latent heat level determination method of a vehicle according to an exemplary embodiment.

FIG. 4 is a diagram illustrating a method of determining a required heating level and a latent heat level determination method of a vehicle according to an exemplary embodiment. In FIG. 4, a method of determining a required heating level is illustrated in block 320, and a method of determining a latent engine heat level is illustrated in block 330.

First, as shown in block 320, the controller 202 compares the user's set temperature (heating set temperature) with the outside air temperature to determine the required heating level. The controller 202 determines the required heating level according to the magnitude of the temperature difference between the set temperature and the outside temperature (322) (324) (326). This will be described with reference to FIG. 6.

FIG. 6 is a diagram illustrating a criterion for determining a required heating level of a vehicle according to an exemplary embodiment. As shown in FIG. 6, in the exemplary embodiment of the present disclosure, the difference between the set temperature set by the user and the outside temperature of the vehicle is divided into a plurality of sections of 0 to 10° C., 11 to 24° C., and 25° C. or more. The sections are divided into required heating levels such as level 0, level 1 and level 2. In FIG. 6, it is assumed that the user set temperature is 25° C.

If the difference between the set temperature and the outside temperature is a temperature in the range of 0 to 10° C., the controller 202 determines that the required heating level is level 0. If the difference between the set temperature and the outside temperature is in the range of 11° C. to 24° C., the controller 202 determines that the required heating level is level 1. If the difference between the set temperature and the outside temperature is 25° C. or more, the controller 202 determines that the required heating level is level 2.

The plurality of sections for classifying the required heating levels are not limited to those shown in FIG. 6, and the required heating levels may be more detailed and variously represented by dividing the difference between the set temperature and the outside temperature into more sections.

Returning to FIG. 4, as shown in block 330, the controller 202 determines the latent heat level of the engine based on the temperature of the coolant of the engine 222 at (332), (334), and (336). This will be described with reference to FIG. 7.

FIG. 7 is a diagram illustrating a criterion for determining an engine latent heat level of a vehicle according to an exemplary embodiment of the present disclosure. As shown in FIG. 7, the temperature of the coolant of the engine 222 is divided into a plurality of sections of 40° C. to 69° C., 70° C. to 89° C., and 90° C. or more, and each section is divided into level 0, level 1 and level 2.

If the temperature of the coolant of the engine 222 is in the range of 40° C. to 69° C., the controller 202 determines that the latent heat level of the engine is at level zero. If the temperature of the coolant of the engine 222 is a temperature within a range of 70° C. to 89° C., the controller 202 determines that the engine latent heat level is level 1. If the temperature of the coolant of the engine 222 is 90° C. or higher, the controller 202 determines that the engine latent heat level is level 2.

The plurality of sections for classifying the required heating level are not limited to those shown in FIG. 7, but by subdividing the temperature of the coolant of the engine 222 into more sections, the engine latent heat level may be represented in more detail and variety.

Figure 5:
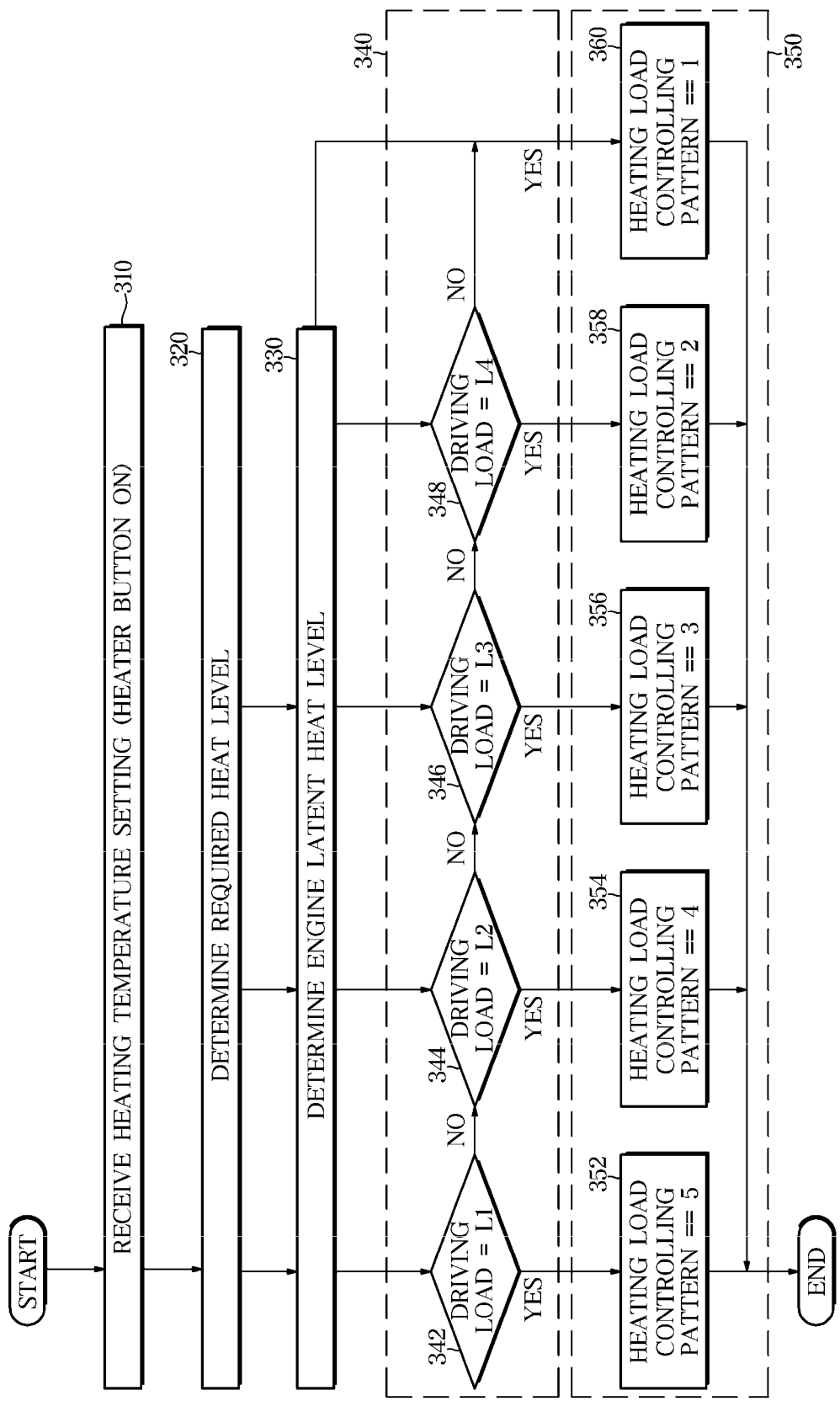
FIG. 5 is a diagram illustrating in detail a driving load level determination method and a driving pattern determination method of a vehicle according to an exemplary embodiment.

FIG. 5 is a diagram illustrating in detail a driving load level determination method and a driving pattern determination method of a vehicle according to an exemplary embodiment. In FIG. 5, a driving load level determination method is shown in block 340, and a driving pattern determination method is shown in block 350.

First, as shown in block 340, the controller 202 checks the operation amount of the accelerator pedal through the magnitude of the electric signal generated from the accelerator pedal sensor 212 to determine the driving load level, and also through the gradient sensor 214, and checks the gradient of the road on which the vehicle is located at (342), (344), (346), and (348). This will be described with reference to FIG. 8.

FIG. 8 is a diagram illustrating a criterion for determining a driving load level of a vehicle according to an exemplary embodiment. As shown in FIG. 8, the controller 202 classifies the vehicle speed into stop, ultra low speed, low speed, medium speed, high speed, and ultra high speed based on the operation amount of the accelerator pedal, and the driving load according to the gradient of the vehicle speed and the driving road. Levels are divided into five values: 1, 2, 3, 4, and 5.

In the case of vehicle speeds, the faster the vehicle speed, the higher the driving load level. In the case of the road slope, the running load level decreases as the slope of the downhill increases, and the running load level increases as the slope of the uphill increases. When the vehicle speed is zero, that is, when the vehicle is stopped, the running load is classified as the minimum value of level 1 regardless of the road slope. If the vehicle speed is very high at high speed and the road slope is uphill, the required vehicle load is maximized and classified as the maximum value of level 5.

The plurality of driving load levels are not limited to those shown in FIG. 8, and the driving load levels may be represented in more detail and variously by further subdividing the road gradient and the vehicle speed into more sections. In classifying the driving load level, the driving load level may be further considered in consideration of road conditions and temperatures, occupants, etc., as well as road gradients and vehicle speeds as shown in FIG. 8.

Returning to FIG. 5, as shown in block 350, the controller 202 uses a plurality of various types of travel load control patterns 1, 2, 3, 4, 5 based on the result of the determination of the required heating level, the engine latent heat level, and the travel load level at (352), (354), (356), (358), and (360).

When the driving pattern is determined, the controller 202 controls the heater (e.g., the planar heating element 122, the air conditioner 216, and the engine 222) based on the determined driving pattern.

The determination of the driving pattern can be made as follows. For example, when the vehicle is stopped, the driving load is zero or close to zero, so that planar heating element priority control is performed for all driving conditions. In this case, it is possible to reduce the driving of the engine 222 of the vehicle being stopped, thereby increasing the fuel economy of an ISG (Idle Stop & Go)-equipped vehicle or an EV mode eco-friendly vehicle.

If the driving load is relatively small while the vehicle is driving, neutral control is performed by appropriately combining planar heating element priority control and air conditioner priority control. In this case, when the latent heat of the engine is not available due to the low temperature of the engine coolant due to the EV running mode of the EV vehicle, the planar heating element 122 and the air conditioner 216 are complemented by performing a combination of the surface heating priority control and the air conditioner priority control.

When the running load of the vehicle is relatively high, the air conditioner priority control is performed. In this case, since the driving load of the vehicle is large, the vehicle is driven in the HEV mode using both the engine 222 and the motor 224 (in the case of an eco-friendly vehicle) or at least the engine 222 is mainly used. By controlling the air conditioner first using latent heat and not using the planar heating element 122, it is possible to reduce the consumption of electrical energy.

The above description is merely illustrative of the technical idea, and various modifications, changes, and substitutions may be made by those skilled in the art without departing from the essential characteristics. Accordingly, the above-described embodiments and the accompanying drawings are not intended to limit the technical spirit, but to explain the scope of the technical spirit by the embodiments and the accompanying drawings. The scope of protection shall be interpreted by the following claims, and all technical ideas within the scope of equivalent shall be interpreted as being included in the scope of rights.

According to an aspect of the present embodiment, the object is to optimize the control of the engine, the heater and the air conditioner based on the running load of the vehicle.

What is claimed is:

1. A vehicle controlling method of a vehicle including an engine, a heater, and an air conditioner, the method comprising:
   determining, by a controller, required heating, latent engine heat, and running load of the vehicle;
   determining, by the controller, a driving pattern of the vehicle based on the required heating, the latent engine heat, and the running load of the vehicle; and
   driving, by the controller, the heater, the air conditioner, and the engine selectively according to the determined driving pattern when the driving pattern is determined;
   wherein determining the driving pattern comprises choosing at least one of the heater, the air conditioner, and the engine to satisfy the required heating of the vehicle; and
   wherein a selection of the heater or the air conditioner is prior to a selection of the engine to reduce driving of the engine.

2. The method according to claim 1, wherein determining the required heating comprises determining which level the required heating of the vehicle corresponds to among a plurality of preset levels.

3. The method according to claim 2, wherein the required heating is a temperature difference between a user set temperature of the air conditioner and an outside temperature of the vehicle.

4. The method according to claim 1, wherein determining the latent engine heat comprises determining which of a plurality of temperature sections the latent engine heat corresponds to.

5. The method according to claim 4, wherein determining the latent engine heat comprises determining the latent engine heat based on a temperature of a coolant of the engine.

6. The method according to claim 1, wherein determining the running load of the vehicle comprises determining which level among a plurality of preset levels the magnitude of the running load of the vehicle corresponds to.

7. The method according to claim 6, wherein determining the running load of the vehicle comprises determining the magnitude of the running load based on an operation amount of an accelerator pedal of the vehicle and a gradient of a road which the vehicle travels.

8. A vehicle comprising:
   an engine;
   a heater;
   an air conditioner;
   a controller configured to determine required heating, latent engine heat, and running load of the vehicle, and determine a driving pattern of the vehicle based on the required heating, the latent engine heat, and the running load of the vehicle;

wherein the controller drives the heater, the air conditioner, and the engine selectively according to the determined driving pattern when the driving pattern is determined;

wherein determining the driving pattern comprises choosing at least one of the heater, the air conditioner, and the engine to satisfy the required heating of the vehicle; and wherein a selection of the heater or the air conditioner is prior to a selection of the engine to reduce driving of the engine.

9. The vehicle according to claim 8, wherein determining the required heating comprises determining which level the required heating of the vehicle corresponds to among a plurality of preset levels.

10. The vehicle according to claim 9, wherein the required heating is a temperature difference between a user set temperature of the air conditioner and an outside temperature of the vehicle.

11. The vehicle according to claim 8, wherein determining the latent engine heat comprises determining which of a plurality of temperature sections the latent engine heat corresponds to.

12. The vehicle according to claim 11, wherein determining the latent engine heat comprises determining the latent engine heat based on a temperature of a coolant of the engine.

13. The vehicle according to claim 8, wherein determining the running load of the vehicle comprises determining which level among a plurality of preset levels the magnitude of the running load of the vehicle corresponds to.

14. The vehicle according to claim 13, wherein determining the running load of the vehicle comprises determining the magnitude of the running load based on an operation amount of an accelerator pedal of the vehicle and a gradient of a road which the vehicle travels.

15. A vehicle controlling method of a vehicle including an engine, a heater, and an air conditioner, the method comprising:

determining, by a controller, required heating, latent engine heat, and running load of the vehicle; and determining, by the controller, a driving pattern of the vehicle based on the required heating, the latent engine heat, and the running load of the vehicle, wherein determining, by the controller, the driving pattern comprises choosing at least one of the heater, the air conditioner, and the engine to satisfy the required heating of the vehicle; and driving, by the controller, the heater, the air conditioner, and the engine selectively according to the determined driving pattern when the driving pattern is determined;

wherein determining the driving pattern comprises choosing at least one of the heater, the air conditioner, and the engine to satisfy the required heating of the vehicle; and wherein a selection of the heater or the air conditioner is prior to a selection of the engine to reduce driving of the engine.

\* \* \* \* \*